United States Patent
Kanou et al.

(10) Patent No.: US 9,328,213 B2
(45) Date of Patent: *May 3, 2016

(54) RUBBER COMPOSITION FOR PNEUMATIC TIRE

(75) Inventors: Motoaki Kanou, Tokyo (JP); Kumiko Konno, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 173 days.

This patent is subject to a terminal disclaimer.

(21) Appl. No.: 13/982,899

(22) PCT Filed: Feb. 3, 2012

(86) PCT No.: PCT/JP2012/052539
§ 371 (c)(1),
(2), (4) Date: Oct. 9, 2013

(87) PCT Pub. No.: WO2012/105697
PCT Pub. Date: Aug. 9, 2012

(65) Prior Publication Data
US 2014/0024762 A1    Jan. 23, 2014

(30) Foreign Application Priority Data

Feb. 3, 2011  (JP) .................. 2011-022194

(51) Int. Cl.
| | |
|---|---|
| B60C 1/00 | (2006.01) |
| C08K 3/34 | (2006.01) |
| C08K 3/04 | (2006.01) |
| C08L 21/00 | (2006.01) |
| C08L 23/22 | (2006.01) |
| C08L 23/28 | (2006.01) |
| C08L 15/02 | (2006.01) |

(52) U.S. Cl.
CPC ................. C08K 3/04 (2013.01); B60C 1/0008 (2013.04); C08K 3/346 (2013.01); C08L 15/02 (2013.01); C08L 21/00 (2013.01); C08L 23/22 (2013.01); C08L 23/283 (2013.01)

(58) Field of Classification Search
CPC ........ B60C 1/0008; C08K 3/346; C08K 3/04; C08L 21/00; C08L 23/22; C08L 23/283; C08L 15/02
USPC .......................................................... 524/445
See application file for complete search history.

(56) References Cited

U.S. PATENT DOCUMENTS

2014/0158269 A1* 6/2014 Konno et al. .................. 152/510

FOREIGN PATENT DOCUMENTS

| EP | 1564241 A1 | 8/2005 |
|---|---|---|
| EP | 1726620 A1 | 11/2006 |
| JP | 5-17641 A | 1/1993 |
| JP | 11-140234 A | 5/1999 |
| JP | 2002-88209 A | 3/2002 |
| JP | 2002-103471 A | 4/2002 |
| JP | 2002-103476 A | 4/2002 |
| JP | 2008-007556 A | 1/2008 |
| WO | 01/62846 A1 | 8/2001 |

OTHER PUBLICATIONS

English language machine translation of JP 2002-088209, Mar. 2002.*
Encyclopedia of Polymer Science and Technology, Carbon Black, p. 67, Oct. 15, 2003.*
International Search Report for PCT/JP2012/052539 dated Feb. 28, 2012.
Extended European Search Report issued Aug. 27, 2014 in corresponding European Patent Application No. 12742643.5.

* cited by examiner

Primary Examiner — Angela C Scott
(74) Attorney, Agent, or Firm — Sughrue Mion, PLLC

(57) ABSTRACT

A rubber composition excellent in air permeation resistance and improved in flexure failure resistance, and a weight-saving pneumatic tire excellent in air permeation resistance and improved in flexure failure resistance in which the rubber composition is used as the inner liner therein is provided. The rubber composition contains, relative to 100 parts by mass of the rubber ingredient (A) therein, from 1 to 9 parts by mass of carbon black (B) and from 80 to 150 parts by mass of a layered or platy clay mineral (C).

8 Claims, 1 Drawing Sheet

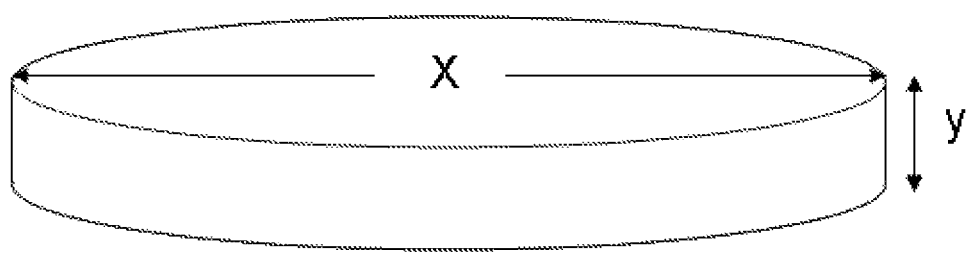

RUBBER COMPOSITION FOR PNEUMATIC TIRE

CROSS REFERENCE TO RELATED APPLICATIONS

This application is a National Stage of International Application No. PCT/JP2012/052539 filed Feb. 3, 2012, claiming priority based on Japanese Patent Application No. 2011-022194 filed Feb. 3, 2011, the contents of all of which are incorporated herein by reference in their entirety.

TECHNICAL FIELD

The present invention relates to a rubber composition, and more precisely to a rubber composition excellent in air permeation resistance and improved in flexure failure resistance and to a weight-saving pneumatic tire provided with the rubber composition as the inner liner therein.

BACKGROUND ART

An inner liner excellent in air permeation resistance has been proposed for the purpose of developing fuel-saving and lightweight tires, and for example, tires highly filled with soft carbon black such as GPF, SRF or the like are known, but are problematic in point of flexure failure resistance and low-temperature characteristics in use in cold environments.

Also known are a technique of incorporating flat mica in a rubber composition (see Patent Reference 1), and a blending technique of incorporating a layered or platy clay mineral such as clay or the like in a rubber composition along with incorporating the above-mentioned soft carbon black therein (see Patent References 2 and 3); however, there may be a probability that the flexure failure resistance and the low-temperature characteristics of the rubber compositions may worsen though the air permeation resistance thereof could be enhanced. Accordingly, it is necessary to develop a rubber composition excellent in flexure failure resistance and air permeation resistance for meeting the requirements of the marketplace including weight saving (fuel saving) of tires.

CITATION LIST

Patent References

Patent Reference 1: JP-A 11-140234
Patent Reference 2: JP-A 05-017641
Patent Reference 3: WO01/062846

SUMMARY OF THE INVENTION

Problems that the Invention is to Solve

Given the situation, the present invention is aimed at providing a rubber composition excellent in air permeation resistance and improved in flexure failure resistance and providing a weight-saving pneumatic tire provided with the rubber composition as the inner liner therein.

Means for Solving the Problems

The present inventors have assiduously studied for the purpose of developing a rubber composition having the above-mentioned good properties and, as a result, have found that a rubber composition containing, relative to 100 parts by mass of the rubber ingredient (A) therein, a specific amount of carbon black (B) and a specific amount of a layered or platy clay mineral (C) meets the object. The present invention has been completed on the basis of the finding.

Specifically, the present invention provides the following:
[1] A rubber composition containing, relative to 100 parts by mass of the rubber ingredient (A) therein, from 1 to 9 parts by mass of carbon black (B) and from 80 to 150 parts by mass of a layered or platy clay mineral (C);
[2] The rubber composition of the above [1], wherein the rubber ingredient (A) comprises 80 to 100% by mass of a butyl-based rubber;
[3] The rubber composition of the above [2], wherein the rubber ingredient (A) comprising a butyl-based rubber is at least one selected from butyl rubber, bromobutyl rubber and chlorobutyl rubber;
[4] The rubber composition of any of the above [1] to [3], wherein the iodine adsorption of the ingredient (B), carbon black is at most 50 mg/g and the dibutyl phthalate absorption thereof is at most 125 ml/100 g;
[5] The rubber composition of any of the above [1] to [4], wherein the aspect ratio of the ingredient (C), layered or platy clay mineral is from 2 to 200;
[6] The rubber composition of any of the above [1] to [5], wherein the ingredient (C), layered or platy clay mineral contains kaolinitic clay or sericitic clay;
[7] The rubber composition of any of the above [1] to [5], wherein the ingredient (C), layered or platy clay mineral contains a hydrated composite of silica and alumina;
[8] A pneumatic tire using the rubber composition of any of the above [1] to [7] as the inner liner therein.

Advantage of the Invention (1) According to the present invention of the above [1] where the rubber composition contains, relative to 100 parts by mass of the rubber ingredient (A) therein, from 1 to 9 parts by mass of carbon black (B) and from 80 to 150 parts by mass of a layered or platy clay mineral (C), the composition can attain the effect of the present invention since the layered or platy clay mineral (C) can be aligned regularly and nearly in parallel to the extrusion direction of the composition.

(2) According to the present invention of the above [2] where the rubber ingredient (A) comprises 80 to 100% by mass, preferably 95% by mass or more, more preferably 100% by mass of a butyl-based rubber, the air permeation resistance of the rubber composition can be enhanced.

(3) According to the present invention of the above [3] where the butyl-based rubber [2] is butyl rubber, bromobutyl rubber or chlorobutyl rubber excellent in air permeation resistance, the effect of the above (2) can be further enhanced. Of the butyl-based rubber, preferred is bromobutyl rubber excellent in co-vulcanizability with a dienic rubber.

(4) According to the present invention of the above [4] where the ingredient (B), carbon black to be used has the characteristic values defined in the present invention of [4], the effect of the above (1) can be further enhanced.

(5) According to the present invention of the above [5], [6] and [7] where the aspect ratio of the ingredient (C), layered or platy clay mineral is defined to fall within a specific range, and the layered or platy clay mineral contains kaolinitic clay or sericitic clay or a hydrated composite of silica and alumina, there is provided a rubber composition excellent in air permeation resistance.

(6) Using any one rubber composition of the present invention of the any of the above [1] to [7] as the inner liner therein provides a tire excellent in air permeation resistance and flexure failure resistance.

BRIEF DESCRIPTION OF DRAWINGS

FIG. 1 is a drawing for explaining the calculating method of the aspect ratio.

MODE FOR CARRYING OUT THE INVENTION

Rubber Composition

The rubber composition of the present invention contains, relative to 100 parts by mass of the rubber ingredient (A) therein, from 1 to 9 parts by mass of carbon black (B) and from 80 to 150 parts by mass of a layered or platy clay mineral (C).

First described are the constituent ingredients of the rubber composition of the present invention.

<Rubber Ingredient (A)>

As the rubber ingredient to be used in the inner liner for pneumatic tires of the present invention, usable is any of a butyl-based rubber or a dienic rubber, but preferred is a butyl-based rubber for attaining the desired low air permeability. As the butyl-based rubber, there may be mentioned, in addition to butyl rubber, halogenobutyl rubbers such as bromobutyl rubber, chlorobutyl rubber, etc.; however, when butyl-based rubber is used, it preferably contains a halogenobutyl rubber. Especially from the viewpoint of attaining a sufficient vulcanization speed, preferred is use of bromobutyl rubber.

As a modified rubber, also usable is a chlorination or bromination-modified copolymer of a copolymer of an iso-mo-noolefin and a paramethylstyrene, and commercial products thereof are available from Exxon.

As the dienic rubber to be blended with the above-mentioned halogenobutyl rubber, for example, there are mentioned natural rubber, synthetic isoprene rubber, cis-1,4-polybutadiene, syndiotactic-1,2-polybutadiene, styrene-butadiene rubber, acrylonitrile-butadiene rubber, chloroprene rubber, etc.; and above all, preferred are natural rubber, synthetic isoprene rubber and cis-1,4-polybutadiene since the glass transition temperature thereof is low. These may be used either singly, two or more of these may be combined.

Preferably, the rubber ingredient comprises from 80% by mass to 100% by mass of a butyl-based rubber and at most 20% by mass of a dienic rubber, from the viewpoint of the air permeation resistance, more preferably from 95% by mass to 100% by mass of a butyl-based rubber and at most 5% by mass of a dienic rubber. The rubber composition of the present invention comprising the rubber ingredient is favorably used as an inner liner for pneumatic tires for bicycles, passenger cars, trucks, buses, etc.

<Carbon Black (B)>

The rubber composition of the present invention uses carbon black as a reinforcing filler. Preferred carbon black includes, for example, N539 (FEF-LS), N550 (FEF), N660 (GPF), N634 (GPF-LS), N642 (GPF-LS), N7524, N762 (SRF-LM-NS), N772, N774 (SRF-HM-NS), etc. As carbon black, preferred is one having the following colloidal characteristics. Specifically, the iodine adsorption (IA) is at most 50 mg/g, more preferably from 40 to 20 mg/g or so. The dibutyl phthalate absorption (DBP) is preferably at most 125 ml/100 g, more preferably from 100 to 30 ml/100 g or so. In this, IA of the above-mentioned colloidal characteristics is a value measured according to ASTM D1510-95, and DBP is according to ASTM D2414-97.

The blending amount of carbon black is preferably from 1 part by mass to 9 parts by mass relative to 100 parts by mass of the rubber ingredient, more preferably from 1 to 6 parts by mass.

When the blending amount of carbon black falls within the defined range of from 1 to 9 parts by mass, then the carbon black used hardly generates steric hindrance or the like, and in case where the rubber composition of the present invention is used as an inner liner for tires, the layered or platy clay mineral therein to be mentioned below can be aligned regularly in the peripheral direction of tires. As a result, excellent results can be obtained in point of flexure failure resistance and low air permeability.

In addition, reduction in reinforcement as well as reduction in factory operability owing to tearing or breaking during rubber composition transportation can be prevented.

<Layered or Platy Mineral (C)>

Further, a layered or platy mineral is used here as a filler for securing the low air permeability of the inner liner for pneumatic tires of the present invention.

As the layered or platy mineral, usable is any of natural products and synthetic products with no specific limitation thereon; and as far as the mean aspect ratio thereof is from 2 to 200, for example, there are mentioned kaolin, clay, mica, feldspar, hydrated composite of silica and alumina, etc. Of those, preferred is clay. Preferred are platy clay such as kaolinitic clay, sericitic clay, fired clay, surface-treated silane-modified clay, etc.; and especially preferred is kaolinitic clay. The mean particle size of the layered or platy mineral is preferably at most 10 μm since too large particles cause reduction in flexibility, more preferably within a range of from 0.2 to 5 μm or so, even more preferably from 0.2 μm to 2 μm. When the mean aspect ratio of the layered or platy mineral is from 2 to 200, then the plane of the layered or platy mineral can align in an inner liner in the direction crossing the thickness direction of the inner liner and can block the permeation pathway of air, therefore bringing about good air permeation resistance; and in particular, when the mineral having a mean aspect ratio of from 3 to 150 is used, then it favorably brings about the maximum air permeation resistance relative to the filled amount thereof. Preferably, the mean aspect ratio is between 5 and 100, especially between 5 and 50. When a clay having a mean aspect ratio (obtained from the mean major axis x and the mean thickness y, as x/y) of more than 200 is used, then the clay could not be dispersed uniformly when its amount is increased in kneading rubber and is unfavorable as causing reduction in flexure failure resistance and air permeation resistance owing to the dispersion failure.

Incidentally, the mean aspect ratio (x/y) is calculated by numbers x and y, wherein x represents the mean length (larger dimension) and y represents the mean thickness of the clay as shown in FIG. 1.

As the kaolinitic clay having a mean aspect ratio of from 2 to 200, for example, favorably usable here are commercial products such as Polyfil DLX and Polyfil DL (both by Huber), etc.

The blending amount of the layered or platy mineral in the inner liner for pneumatic tires of the present invention can be from 80 to 150 parts by mass, but preferably from 90 to 130 parts by mass. When the blending amount is less than 80 parts by mass, the intended low air permeability could not be attained; but when more than 150 parts by mass, it is unfavorable as causing reduction in flexure resistance and worsening low-temperature characteristics. The blending amount of carbon black to be incorporated at the same time is preferably from 1 to 9 parts by mass, as described above.

Regarding the preferred blending ratio of the rubber ingredient (A), the carbon black (B) and the layered or platy mineral (C) to be used in the inner liner for pneumatic tires of the present invention, when the ingredient (B) accounts for from 1 to 9 parts by mass and the ingredient (C) for from 90 to 130 parts by mass relative to 100 parts by mass of the rubber ingredient (A) containing at least 95% by mass of bromobutyl rubber, then the object of the present invention can be attained; and the inner liner can have, as a favorable value, an air permeation coefficient of at most $2.0 \times 10^{-10}$ $cm^3 \cdot cm/cm^2 \cdot sec \cdot cmHg$, and can secure excellent flexure failure resistance.

When the air permeation coefficient is defined to be not higher than the above-mentioned value, the gauge of the inner liner can be thinned therefore securing weight-saving tires.

The flexure failure of the inner liner depends on the reinforcement in the matrix, and the flexure failure resistance of the tire mainly depends on the strength of the reinforcing layer therein. In case where a butyl-based rubber (for example, bromobutyl rubber) is used as the rubber ingredient in the inner liner, then a large amount of a filler must be incorporated therein for attaining the intended air permeation coefficient of at most $2.0 \times 10^{-10}$ $cm^3 \cdot cm/cm^2 \cdot sec \cdot cmHg$, which, however, is unfavorable for flexure failure resistance. Regarding the air permeability necessary for tires, the air permeability in the direction perpendicular to the tire tread; and accordingly, the low air permeability in the direction perpendicular to the tire tread can be attained by aligning the layered or platy mineral regularly in the direction perpendicular to the tire tread, and both the air permeation resistance and the flexure failure resistance can be satisfied by aligning the layered or platy mineral regularly in the peripheral direction of the tire.

However, when the blending amount of the ingredient (B), carbon black is less than 1 part by mass, then the reinforceability may be poor and there may occur a problem in factory operability.

The inner liner for pneumatic tires of the present invention may optionally contain, in addition the above-mentioned ingredients (A), (B) and (C), any ordinary ingredients generally used in inner liners, for example, vulcanizing agent, vulcanization accelerator, vulcanization retarder, antiaging agent, antioxidant, softening agent, lubricant, vulcanization aid, tackifier, etc.

The inner liner for pneumatic tires of the present invention can be produced by kneading the above-mentioned ingredient, for example, in a Banbury mixer. The inner liner production with the rubber composition can also be attained, for example, using a calender roll.

EXAMPLES

The invention is described in more detail with reference to the following Examples and Comparative Examples; however, the invention is not restricted by these.

Examples 1 to 11, Comparative Examples 1 to 8

The ingredients shown in Tables 1-1 to 1-6 and, as additional ingredients, 10 parts by mass of process oil "No. 2 Spindle Oil" by Idemitsu, 2 parts by mass of zinc flower and 1 part by mass of sulfur were mixed and kneaded with a Banbury mixer to prepare a rubber composition for inner liners, which was tested for the items mentioned below.

(1) Flexure Failure:

A rubber test piece was prepared according to JIS 6260-1999, "De Mattia flex cracking test for vulcanized rubber and thermoplastic rubber", and tested at room temperature under the condition of 40 mm stroke, and the number of the strokes given thereto until the test piece was thereby broken was counted. Samples given a larger number of strokes until breaking are better.

(2) Air Permeation Coefficient:

A test piece of the inner liner taken out by deconstructing a tire was tested according to JIS K7126-1-2006 "Plastic films, test method for gas permeability (differential pressure method)". Samples having a smaller value are more excellent in air permeation resistance.

The tire size was 11R22.5.

(3) Air Permeability Index:

Comparative Example 2 in Table 1-1, Comparative Example 4 in Table 1-2 and Comparative Example 6 in Table 1-3 are controls, and the air permeability is shown based on the index value of the control. Samples having a smaller index are better.

TABLE 1-1

| | Comparative Example 1 | Comparative Example 2 | Example 1 | Example 2 | Example 3 |
|---|---|---|---|---|---|
| Bromobutyl Rubber | 100 | 100 | 100 | 100 | 100 |
| Clay*1 | 80 | 80 | 80 | 80 | 80 |
| Carbon Black (GPF) | 40 | 20 | 9 | 6 | 3 |
| Number of Strokes in flex cracking test | 10 | 200 | 600 | 950 | 1800 |
| Air Permeation Coefficient*2 | 2.3 | 2.2 | 2 | 1.97 | 1.95 |

Note:
*1 Clay "Polyfil DL" by J. M. Huber, having aspect ratio of 15.
*2 Air Permeation Coefficient: $\times 10^{-10}$ $cm^3 \cdot cm/cm^2 \cdot sec \cdot cmHg$.

As shown in Table 1-1, the clay amount in the rubber composition was fixed at 80 parts by mass, and the carbon black amount was varied.

TABLE 1-2

| | Comparative Example 3 | Comparative Example 4 | Example 4 | Example 5 | Example 6 |
|---|---|---|---|---|---|
| Bromobutyl Rubber | 100 | 100 | 100 | 100 | 100 |
| Clay*1 | 100 | 100 | 100 | 100 | 100 |
| Carbon Black (GPF) | 40 | 20 | 9 | 6 | 3 |
| Number of Strokes in flex cracking test | 5 | 170 | 400 | 750 | 1400 |
| Air Permeation Coefficient*2 | 2.1 | 2 | 1.7 | 1.67 | 1.65 |

As shown in Table 1-2, the clay amount in the rubber composition was fixed at 100 parts by mass, and the carbon black amount was varied.

TABLE 1-3

| | Comparative Example 5 | Comparative Example 6 | Example 7 | Example 8 | Example 9 |
|---|---|---|---|---|---|
| Bromobutyl Rubber | 100 | 100 | 100 | 100 | 100 |
| Clay*1 | 150 | 150 | 150 | 150 | 150 |
| Carbon Black (GPF) | 40 | 20 | 9 | 6 | 3 |
| Number of Strokes in flex | 1 | 30 | 200 | 250 | 450 |

TABLE 1-3-continued

|  | Comparative Example 5 | Comparative Example 6 | Example 7 | Example 8 | Example 9 |
|---|---|---|---|---|---|
| cracking test |  |  |  |  |  |
| Air Permeation Coefficient*2 | 1.7 | 1.55 | 1.35 | 1.31 | 1.28 |

As shown in Table 1-3, the clay amount in the rubber composition was fixed at 150 parts by mass, and the carbon black amount was varied.

In addition, the clay amount variation (Table 1-4), the butyl rubber amount variation as the rubber ingredient (Table 1-5), and the carbon black type variation (GPF, FEF) (Table 1-6) were investigated.

TABLE 1-4

|  | Comparative Example 7 | Example 1 | Example 4 | Example 7 | Comparative Example 8 |
|---|---|---|---|---|---|
| Bromobutyl Rubber | 100 | 100 | 100 | 100 | 100 |
| Clay | 70 | 80 | 100 | 150 | 160 |
| Carbon Black (GPF) | 9 | 9 | 9 | 9 | 9 |
| Number of Strokes in flex cracking test | 850 | 600 | 400 | 200 | 180 |
| Air Permeation Coefficient | 2.2 | 2 | 1.7 | 1.35 | 1.3 |

TABLE 1-5

|  | Example 10 | Example 5 |
|---|---|---|
| Bromobutyl Rubber | 95 | 100 |
| NR RSS No. 1 | 5 | 100 |
| Clay | 100 | 100 |
| Carbon Black (GPF) | 6 | 6 |
| Number of Strokes in flex cracking test | 200 | 750 |
| Air Permeation Coefficient | 2.00 | 1.67 |

TABLE 1-6

|  | Example 11 | Example 5 |
|---|---|---|
| Carbon Black | FEF | GPF |
| Clay | 5 | 100 |
| C/B | 6 | 6 |

TABLE 1-6-continued

|  | Example 11 | Example 5 |
|---|---|---|
| Number of Strokes in flex cracking test | 400 | 750 |
| Air Permeation Coefficient | 2.00 | 1.67 |

In the rubber compositions shown in Tables 1-1 to 1-6, incorporated were 10 parts by mass of process oil "No. 2 Spindle Oil" by Idemitsu, 2 parts by mass of zinc flower and 1 part by mass of sulfur as additional ingredients.

INDUSTRIAL APPLICABILITY

The present invention provides a rubber composition excellent in air permeation resistance and improved in flexure failure resistance, and provides a weight-saving pneumatic tire excellent in air permeation resistance and improved in flexure failure resistance in which the rubber composition is used as the inner liner therein.

The invention claimed is:

1. A rubber composition containing, relative to 100 parts by mass of the rubber ingredient (A) therein, from 1 to 9 parts by mass of carbon black (B) and from 80 to 150 parts by mass of a layered or platy clay mineral (C)
   wherein the rubber ingredient (A) comprises 80 to 100% by mass of a butyl-based rubber and at most 20% by mass of a dienic rubber.

2. The rubber composition according to claim 1, wherein the rubber ingredient (A) comprises 100% by mass of a butyl-based rubber.

3. The rubber composition according to claim 2, wherein the rubber ingredient (A) comprising a butyl-based rubber is at least one selected from butyl rubber, bromobutyl rubber and chlorobutyl rubber.

4. The rubber composition according to claim 1, wherein the iodine adsorption of the ingredient (B), carbon black is at most 50 mg/g and the dibutyl phthalate absorption thereof is at most 125 ml/100 g.

5. The rubber composition according to claim 1, wherein the aspect ratio of the ingredient (C), layered or platy clay mineral is from 2 to 200.

6. The rubber composition according to claim 1, wherein the ingredient (C), layered or platy clay mineral contains kaolinitic clay or sericitic clay.

7. The rubber composition according to claim 1, wherein the ingredient (C), layered or platy clay mineral contains a hydrated composite of silica and alumina.

8. A pneumatic tire using the rubber composition of claim 1 as the inner liner therein.

* * * * *